(No Model.) 4 Sheets—Sheet 1.
J. W. HYATT.
AGITATING FILTER DIAPHRAGMS WITH ABRADING MATERIAL FOR CLEANSING THEIR SURFACES.
No. 366,726. Patented July 19, 1887.
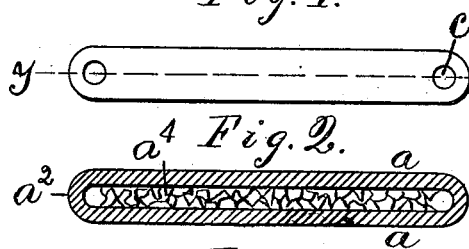
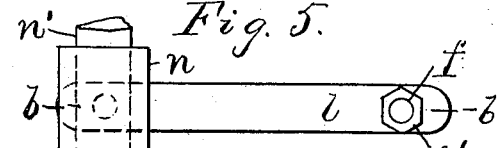
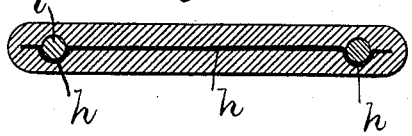
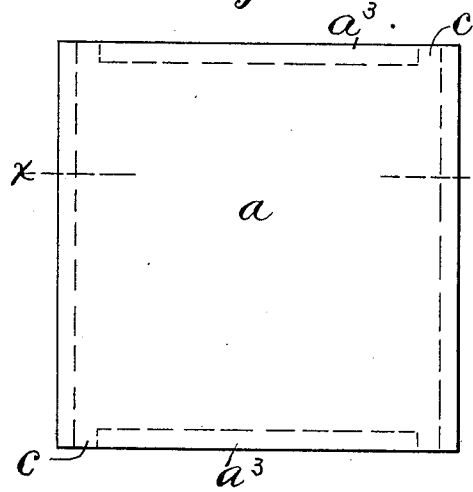
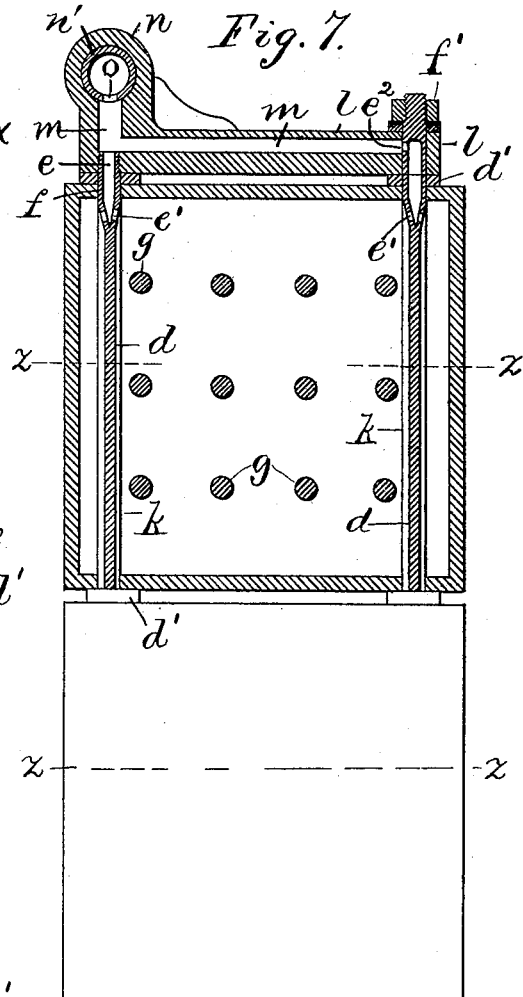
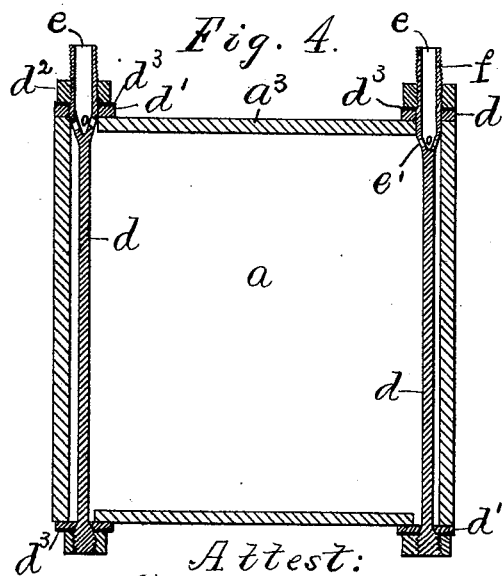
Attest:
Frederick C. Fischer.
Victor J. Evans.
Inventor.
John W. Hyatt per
Crane & Miller attys (No Model.) 4 Sheets—Sheet 2.

J. W. HYATT.
AGITATING FILTER DIAPHRAGMS WITH ABRADING MATERIAL FOR CLEANSING THEIR SURFACES.

No. 366,726. Patented July 19, 1887.

ATTEST.
Frederick G. Fischer
Victor J. Evans

INVENTOR.
John W. Hyatt
per Crane & Miller Attys (No Model.)  4 Sheets—Sheet 3.

J. W. HYATT.
AGITATING FILTER DIAPHRAGMS WITH ABRADING MATERIAL FOR CLEANSING THEIR SURFACES.

No. 366,726.  Patented July 19, 1887.

ATTEST.  
J. Henry Kaiser  
Victor J. Evans.

INVENTOR.  
John W. Hyatt  
per Crane & Miller attys (No Model.) 4 Sheets—Sheet 4.
J. W. HYATT.
AGITATING FILTER DIAPHRAGMS WITH ABRADING MATERIAL FOR CLEANSING THEIR SURFACES.
No. 366,726. Patented July 19, 1887.
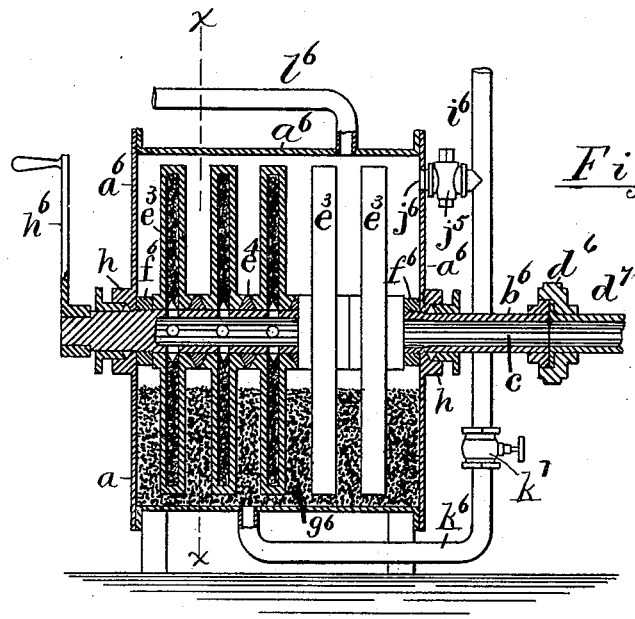
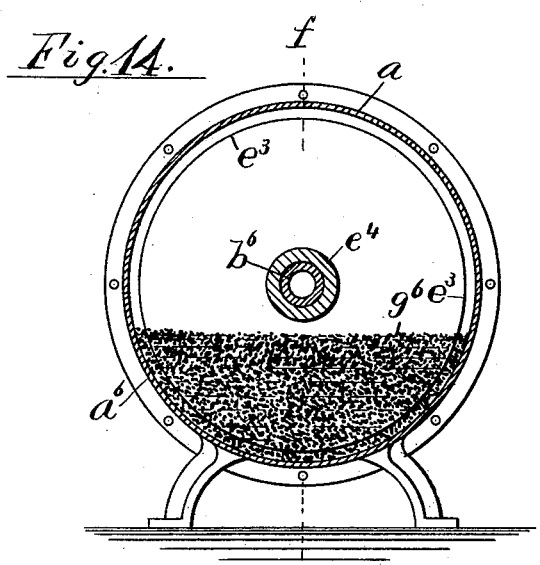
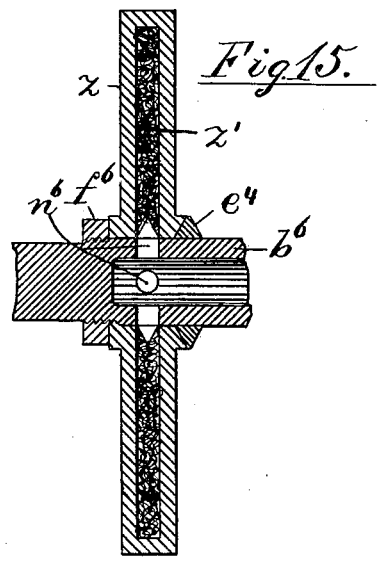
Attest:
L. Lell.
F. G. Fischer.
Inventor.
John W. Hyatt, per
Crane & Miller, Attys.

United States Patent Office.

JOHN W. HYATT, OF NEWARK, NEW JERSEY.

AGITATING FILTER-DIAPHRAGMS WITH ABRADING MATERIAL FOR CLEANSING THEIR SURFACES.

SPECIFICATION forming part of Letters Patent No. 366,726, dated July 19, 1887.

Original application filed November 23, 1886, Serial No. 219,574. Divided and this application filed March 24, 1887. Serial No. 232,238. (No model.)

*To all whom it may concern:*

Be it known that I, JOHN W. HYATT, a citizen of the United States, residing at Newark, Essex county, New Jersey, have invented certain new and useful Improvements in Agitating Filter-Diaphragms with Abrading Material for Cleansing their Surfaces, fully described and represented in the following specification, and the accompanying drawings, forming a part of the same.

The object of this invention is to effect the abrasion of porous filtering-diaphragms formed of hard material, by moving the same in proximity to one another with loose intermediate abrading material, as sand or coke; and my improvement consists in the process and apparatus hereinafter set forth.

The apparatus shown herein is constructed of flat hollow filter-plates connected together by their edges and arranged in two series, with the plates of one series intermediate or alternating with those of the other.

I have not claimed the special construction of the hollow filter-plates herein, as I have filed a separate patent application, No. 231,042, to include the same.

The construction will be understood by reference to the annexed drawings, in which—

Figure 8:
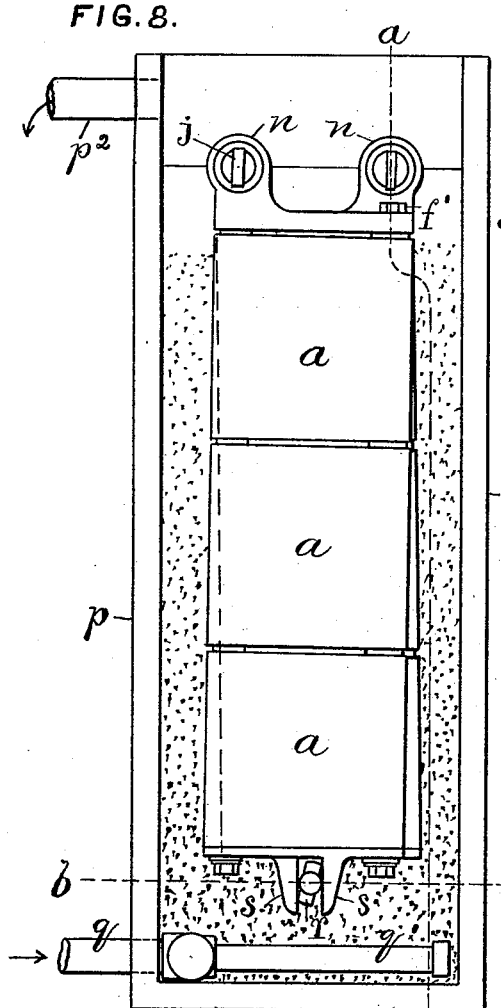
Figure 9:
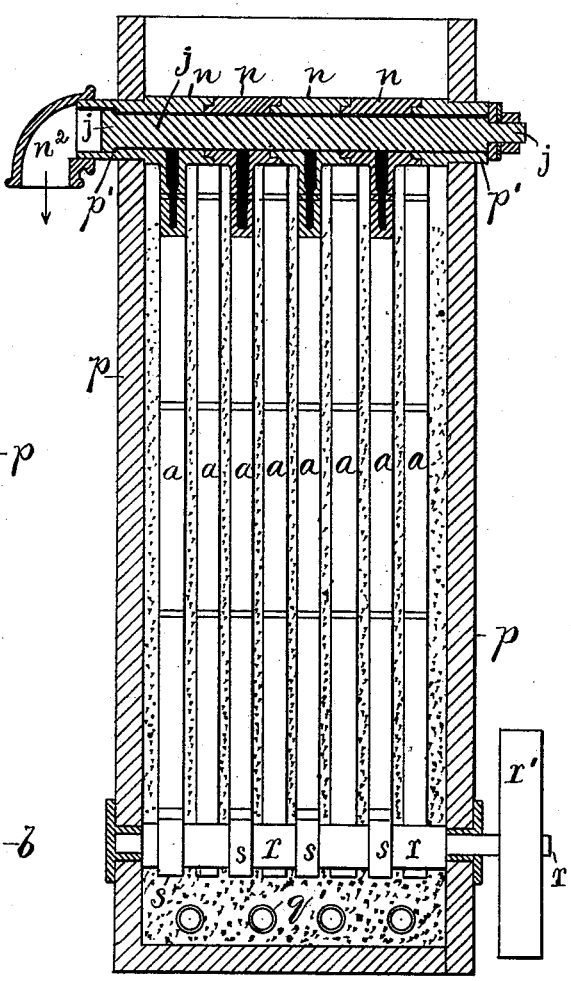
Figure 10:
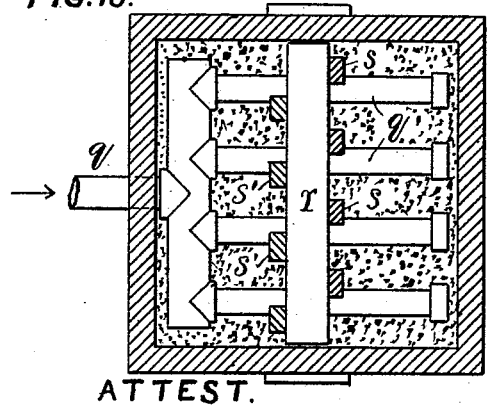
Figure 11:
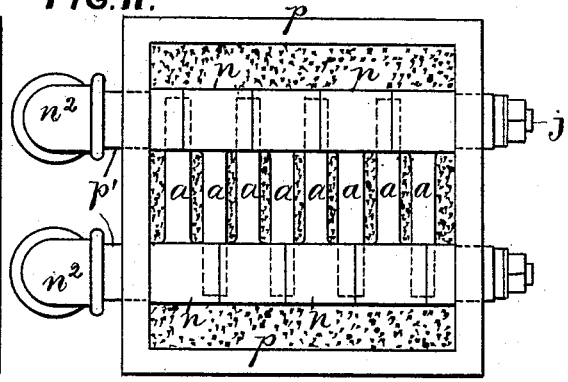
Figure 12:
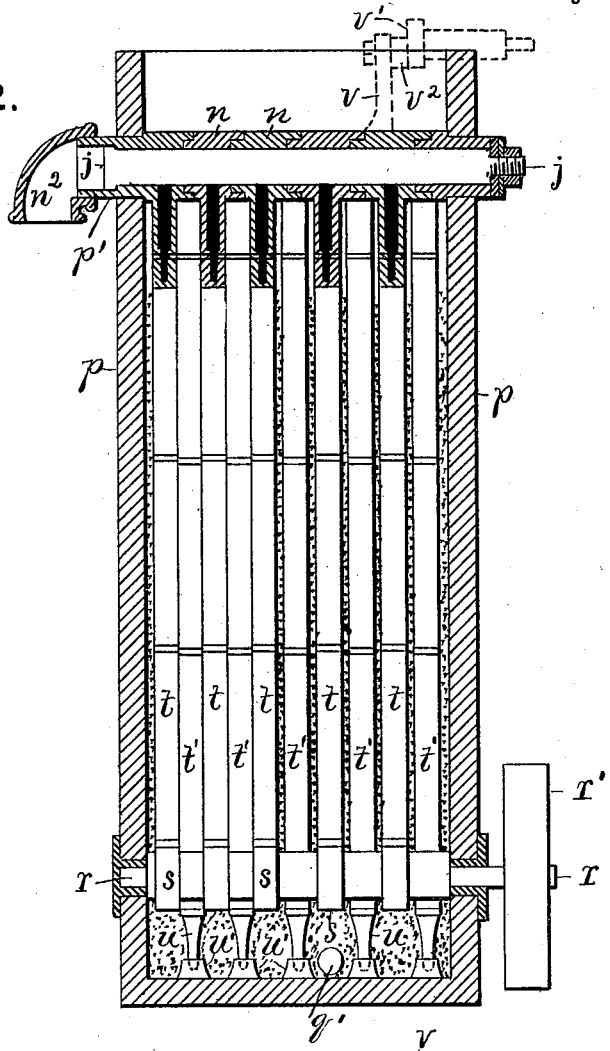
Figure 13:
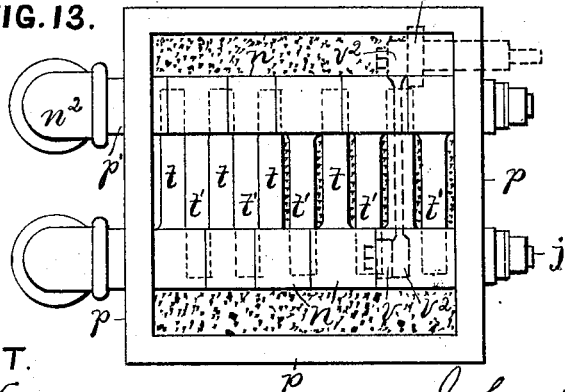

Figure 1 is a plan of a filter-plate formed of porous material—as baked clay or artificial stone—and having an internal chamber filled with mineral fragments to sustain the pressure upon the walls of the plate. Fig. 2 is a section of the same on line $x\ x$ in Fig. 3, which is a side view of an entire plate. Fig. 4 is a longitudinal section of the plate with its water-connections, the view being sectioned, on line $y\ y$ in Fig. 1. Figs. 5, 6, and 7 show similar views of a plate of alternate construction. Fig. 5 is a top view of one plate with the water-header attached thereto. Fig. 6 is a transverse section of such plate, taken on line $z\ z$ in Fig. 7. Fig. 7 is a side view of two plates, shown connected together by tie-rods, and a water-header attached to the top plate, which with the header is shown in vertical section, similar to Fig. 4. Fig. 8 is an elevation of a filter-casing containing two sets of filter-plates suspended over two outlet-pipes, the side of the casing being removed to expose its contents. Fig. 9 is a vertical section on line $a\ a$ in Fig. 8. Fig. 10 is a horizontal section on line $b\ b$ in Fig. 8, with the rotating shaft turned partly around; and Fig. 11 is a plan of the upper end of the casing and its contents. Fig. 12 is a view similar to Fig. 9, but having the alternate sets of plates held stationary; and Fig. 13 is a plan of the apparatus shown in Fig. 12. Fig. 14 is a section, on line $x\ x$ in Fig. 16, of a cylindrical filter-casing containing circular disks. Fig. 15 is a central longitudinal section of one of the disks and part of the sustaining-shaft; and Fig. 16 is an elevation of the filter, shown in longitudinal section, where hatched, on line $f\ f$ in Fig. 14.

The walls of each plate are separated by a very thin water-space, and studs are formed between the walls at intervals to support them under external pressure.

In Figs. 1 to 4, $a$ are the walls of a rectangular plate united around all its edges, and $a'$ the intervening water-space. $c$ are outlets extending from such water-spaces through the opposed edges of the plate to insert tie-rods $d$, which are packed at their opposite ends with their yielding washers $d'$, and nuts $d^2$ applied to such washers over metallic plates $d^3$. The tie-rods are terminated at one end in tubes $e$, having apertures $e'$ leading to the water-space within the plate, so that the fluid filtered through the walls of the plate into the water-space may be drawn off by connections with such tubes.

In Fig. 2, $a^4$ shows fragments of pottery inserted between the walls $a$ in the process of manufacture to sustain the external pressure.

In Fig. 6 the water-space is shown very thin, and would be formed by a sheet of pasteboard inserted between two sheets of clay and discharged therefrom in the act of burning the latter to convert it into a porous filtering substance.

Parallel channels $k$ (shown in Fig. 7) are formed by inserting wooden rods $i$ between the sheets of clay in contact with the pasteboard $h$, and which would also be charred and destroyed when the plate was burned, leaving passages for the tie-rods $d$ in communication with the thin water-space.

$l$ are the water-headers, formed of cast-iron and connected with the nozzles $f$, formed upon the outlet-tubes $e$, a passage, $m$, being formed within the header, and an opening, $e^2$, in one of the tubes, so that the fluid from both the tubes may be conducted to a common outlet-pipe, $n'$. The header is formed, as shown in Figs. 5 and 7, with a socket, $n$, through which an outlet-pipe may be passed, as shown in Fig. 7; or the sockets may be clamped together, as shown in Fig. 9, where a flat tie-bar, $j$, is shown fitted through the respective headers, and furnished with a shoulder, $f'$, at one end, and a nut, $f^2$, at the other, to bind them together, the perforation through the headers being notched at its upper and lower sides to fit the edges of the tie-bar. A series of three filter-plates (lettered $a$ in Figs. 8, 9, and 11) is represented as connected with each header by the vertical tie-rods $d$, and four such headers are represented as clamped together by the tie-bar $j$, and the headers adjacent to the casing $p$ formed with journals $p'$, so as to turn in bearings or apertures in the casing with the series of filter-plates hanging down freely in the casing below. Two such sets of headers are mounted in the casing with the series of plates depending from them, arranged alternately between one another, the sockets $n$ being formed at one end only of each header, so that the sets of headers may be mounted in the top of the casing side by side with the series of plates substantially coincident with one another as they hang below. A rotating or oscillating bar, $r$, is arranged across the casing beneath the middle of the several plates, and lugs $s$ are projected from the lower ends of the plates, and are pressed toward the bar by the weight of the plates to which they are attached, and which are hung from the supporting-sockets at one corner only.

It will be understood that the two sets of heads have each four series of plates depending from them, the lugs upon one set of plates, as shown at $s$ in Figs. 8 and 10, being pressed toward one side of the bar, and the lugs $s'$ upon the intervening sets of plates being pressed upon the opposite side of the bar. The bar is shown of flat section and operates when rotated to press the lugs sidewise, and to thus oscillate the series of plates to which it is attached around the center of the supporting-socket $n$. When the bar is turned flatwise between the lugs $s\ s'$, as shown in Fig. 8, the sets of plates are pressed slightly downward and sidewise by their weight into the inclined positions shown in Fig. 8; but when the bar is turned edgewise the lugs would be pressed apart and the sets of plates would be thrown into a perpendicular position.

A pulley, $r'$, is shown in Fig. 9 upon the end of the bar to rotate it; but it may be actuated by oscillation through an arc of ninety degrees by any suitable means, if preferred. It is also obvious that a crank motion and various other mechanical means would be an exact equivalent for such bar if operated to oscillate one or both sets of plates.

Abrading material—as sand, coke, or pumice-stone—is placed in the casing around the filter-plates, and the effect of oscillating or vibrating the plates is to scratch or rub their surfaces against such loose particles of abrading material, and to thus maintain the surfaces of the plates in a clean condition during the filtering operation, so that their efficiency and capacity for purifying the water are maintained in a high degree.

The water to be filtered is preferably introduced at the bottom of the casing through a pipe, $q$, provided within the casing with branches $q'$, perforated to discharge the water among the abrading material and between the various plates in the different sets or series.

I have in a previous patent application, No. 219,574, claimed the abrasion of filtering-diaphragms by the use of granular material moved by a current of water; but no such current of water is employed in my present construction, the fluid which is admitted by the pipe $q$ and discharged from the branches $q'$ being merely in such volume as will percolate through the filter-plates and be discharged in a purified condition. Such a current is obviously incapable of agitating—that is, moving and displacing—the particles of abrading material which are filled in the casing around and between the filter-plates, for the reason that its volume is constantly depressed as it rises upward within the plates by percolation through their surfaces, and its movement and volume are wholly exhausted at the upper part of the plates, which are merely supplied with fluid sufficient to pass through their walls.

If coke or pumice-stone be supplied in particles of sufficient size to float, the casing should be made of sufficient height to inclose a considerable volume of such material above the tubes of the filter-plates, that its weight may force the lower particles downward between the plates and retain the particles in proximity to the plates, so as to abrade them when vibrated.

When sand of greater gravity than water is supplied around the plates, the effect of the inflowing fluid is simply to soften the mass of sand, as in that class of filters in which upward filtration is practiced through a bed of granular material, and in which no displacement of the particles occurs or is permitted, as it would immediately afford a free vent for the water-current and prevent the purification of the fluid.

The essential feature of my invention is the agitation of the filtering plates or media against an abrading agent, and it is therefore obvious that one set of plates may be held stationary and arranged alternately with the plates in a movable set, with the latter close enough to the former to rub gently against them and thus abrade the surfaces of both. In Figs. 12 and 13 I have shown a means of thus operating the plates, Fig. 12 showing a view of a filter similar to Fig. 8, and Fig. 13 a view similar to Fig. 11.

The plates in the stationary set are lettered $t$ and the movable plates $t'$, the former being held immovable by studs $u$, projected from their lower ends into steps $u'$ in the bottom of the casing C, and the latter being vibrated between the fixed plates by an arm, $v$, attached to one of their socket-bearings $n$, and oscillated by a crank, $v'$, and link $v^2$. (Shown only in dotted lines.) The plates of the fixed and movable sets are shown close together at one end of each set to illustrate the mutual abrasion of the plates by direct contact; but a small space, $w$, is shown between the opposed plates at the other ends of the two sets, in which loose abrading material could be placed. The vibrations of the movable plates would then not only cleanse such plates by contact with such material, but would agitate the same against the fixed plates with equal effect.

It is obvious that my invention may be practiced with a great variety of apparatus, and that the vibration may be effected by other means than that shown herein. It is obviously immaterial whether the plates be oscillated around a fixed center, as the socket $n$, in which case the parts farthest from the center have the greatest movement, or whether the plates are vibrated up and down, or horizontally, or continuously around in the same direction upon a fixed axis. Thus in Figs. 14 and 16 I have shown a means of either oscillating or continuously rotating the filter-diaphragms in contact with the abrading material, the diaphragms being formed as disks $e^3$, secured together upon a hollow shaft, $b^6$, with intermediate packing-washers, $e^4$, by means of nuts $f^6$.

The casing $a^6$ is of cylindrical form with horizontal axis, and provided with stuffing-boxes $h$ at each end, and the shaft $b^6$ is connected at one end with a swivel-joint, $d^6$, connecting it with a stationary discharge-pipe, $d^7$, and at the opposite end with a crank, $h^6$, for rotating the shaft and the attached disks when desired. The supply-pipe $i^6$ is shown provided with branches $j^6$ and $k^6$, provided, respectively, with cocks $j^5$ and $k^7$. The casing is supplied with a waste or outlet pipe, $l^6$, which would be closed by any suitable means when filtering, and the mass of abrading material (lettered $g^6$) which is shown between the lower parts of the several disks would operate to abrade the surfaces of the disks when rotated.

The water may be introduced through the cock $k^7$, to discharge the accumulated impurities from the filter, the water then entering beneath the abrading material and carrying off the impurities through the waste-pipe $l^6$.

One of the filtering-disks is shown, upon a larger scale in Fig. 3, as formed of a composition with fine grain, $z$, upon its exterior and coarser grain, $z'$, upon its interior, to lead the filtered water to the holes $n^6$ in the hollow shaft $b^6$. The particular construction of such disks is not claimed herein, but in a separate patent application, No. 219,574, filed November 23, 1886.

With the means shown in Fig. 16 the filter-diaphragms may be agitated by rotation or oscillation continuously or intermittently during the filtering operation, or when the latter is suspended, as may be preferred.

It will be understood that I regard my present method of cleansing the filter-diaphragms as wholly different from that claimed in my patent application.

Where the entire water-supply requires immediate filtration by a single movement through percolating plates or cylinders, the movement of such fluid through such a filtering medium is not sufficiently rapid (when the filter is constructed upon a large scale) to agitate a mass of sand or other abrading material in contact with all the filtering-surfaces, and the necessary abrasion of the filtering media by the sand is therefore effected in my present invention by agitating the filter-diaphragms instead of the abrading material. The desired abrasion is therefore effected in the desired degree without regard to the velocity or volume of the fluid which may be passing through the filter-casing.

The form of the filtering-diaphragms forms no part of my present invention, and may therefore be varied in any degree, as is partially illustrated in the variations of form shown in Figs. 1 and 15.

A waste or overflow pipe, $p^2$, is shown in Fig. 8, and is used to discharge the fluid from within the filter-casing when the latter becomes highly charged with impurities, which discharge is effected by closing the outlets from the discharge-pipes $n^2$ and permitting the fluid to find its exit from the casing entirely through the overflow-pipe.

I hereby disclaim the subject-matter of application No. 219,574, since patented with No. 364,933, on June 14, 1887, as it contains a generic claim to the combination, with the unfiltered fluid, of loose particles of abrading material agitated by any means in relation to the filter-diaphragms to cleanse the latter.

This application is filed as a division of my application No. 219,574, filed November 23, 1886, for method and apparatus for cleansing filtering-surfaces, to cover certain specific forms of the invention shown and not claimed in my said prior application.

Having thus set forth my invention, what I claim herein is—

1. In a filter, the combination, with a series of filter-plates mounted movably within a casing containing loose granular abrading material, of means for agitating the filter-plates during the filtering operation, and thus cleansing the surfaces by abrasion with such abrading material, substantially as herein set forth.

2. In a filter, the combination, with a series of flat filter-plates arranged side by side within a casing containing loose granular abrading material, of means for agitating the alternate plates of the series, as and for the purpose set forth.

3. In a filter, the combination, with a series of flat filter-plates arranged with their flat sides adjacent within a casing containing loose granular abrading material, of means for agitating the alternate plates of the series simultaneously in opposite directions, as and for the purpose set forth.

4. In a filter, the combination, with a series of filter-plates having each a socket-bearing and a water-outlet leading therein, and means for clamping the series of socket-bearings together, of a casing to inclose such plates, and a common outlet connected with such series of socket-bearings to receive the fluid from the plates, the whole arranged and operated as and for the purpose set forth.

5. In a filter, the combination, with a series of filter-plates having each a socket-bearing and a water-outlet leading therein, and means for clamping the series of socket-bearings together, of a casing to inclose such plates and a common outlet connected with such series of socket-bearings to receive the fluid, and vibrating mechanism operating to oscillate the plates by the turning of their socket-bearings, as and for the purpose set forth.

6. In a filter, the combination, with a series of filter-plates having each a socket-bearing and a water-outlet leading therein, and means for clamping the series of socket-bearings together, of a casing to inclose such plates, a common outlet connected to such series of socket-bearings to receive the fluid from each plate, a flat rotating shaft arranged below such plates, and projections from the plates fitted alternately to the opposite sides of said shaft, and operating when the shaft is rotated to vibrate the alternate plates in opposite directions, as and for the purpose set forth.

In testimony whereof I have hereunto set my hand in the presence of two subscribing witnesses.

JOHN W. HYATT.

Witnesses:
HENRY J. MILLER,
FREDERICK C. FISCHER.